A. HAMMER.
Beer Cooler.
No. 9,243.
Patented Sept. 7, 1852.
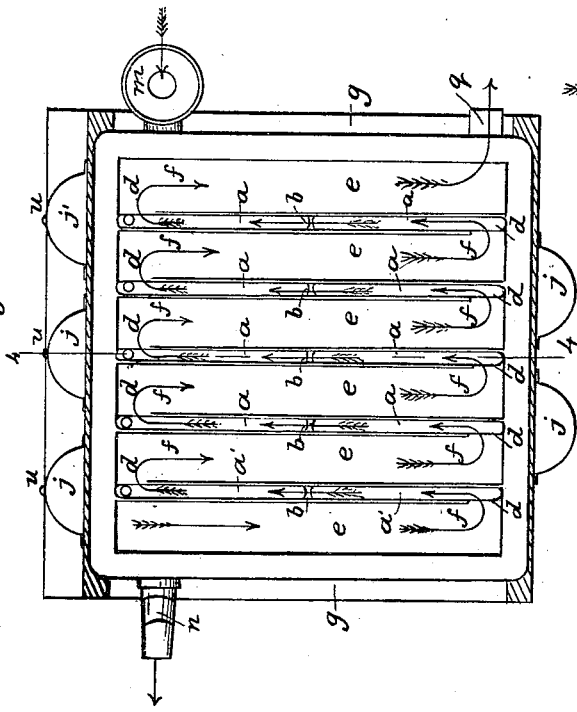
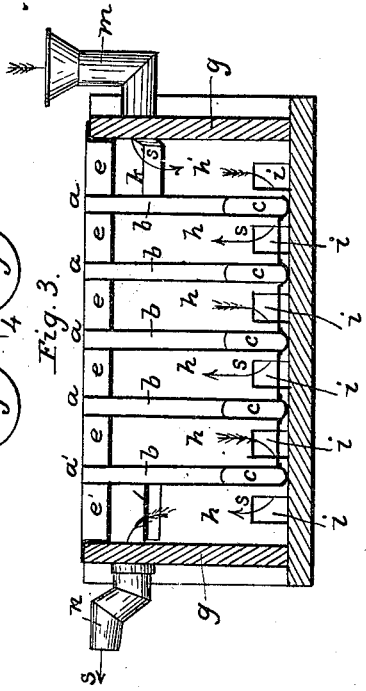
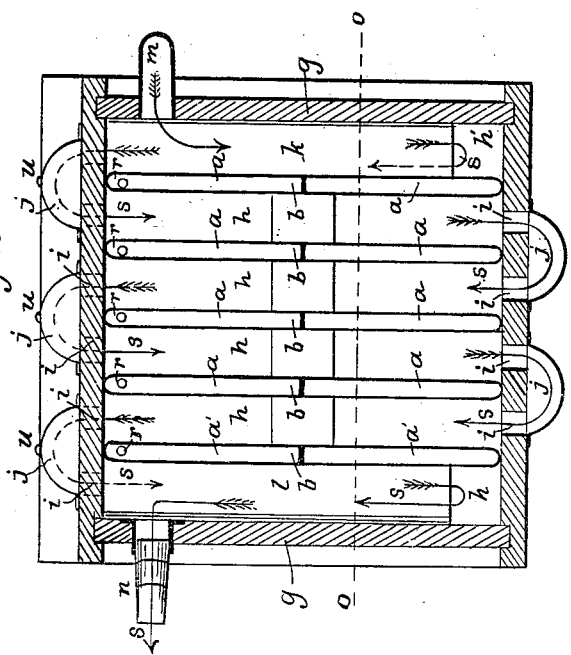
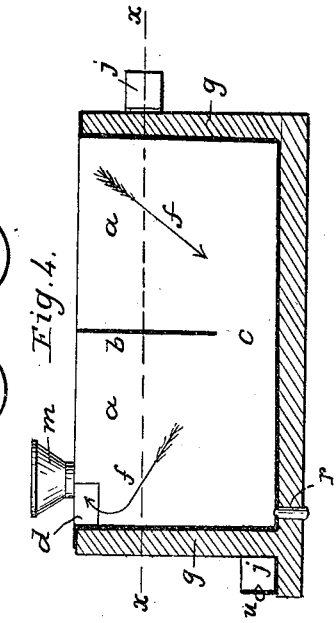

UNITED STATES PATENT OFFICE.

ADOLPH HAMMER, OF PHILADELPHIA, PENNSYLVANIA.

REFRIGERATOR OF WORT.

Specification of Letters Patent No. 9,243, dated September 7, 1852.

*To all whom it may concern:*

Be it known that I, ADOLPH HAMMER, of the city and county of Philadelphia and State of Pennsylvania, have invented a new and useful Improvement in Refrigerators for Fermentative Liquors; and I do hereby declare the following to be a full, clear, and exact description thereof, reference being had to the accompanying drawing and letters of reference marked thereon, forming part of this specification, in which—

Figure 1, is a plan view of the apparatus, Fig. 2, is a horizontal section, taken as denoted by the line $x, x,$ of Fig. 4, Fig. 3, is a vertical section, taken as denoted by the line $o, o,$ of Fig. 2, and Fig. 4, is a vertical section taken as indicated by the line 4, 4, of Fig. 1.

Where the same letters of reference occur on the several figures, they indicate the same parts.

My invention refers to an apparatus for cooling fermentative liquors during the process of manufacture, and the nature of it consists in having a series of deep narrow open chambers, furnished with central partitions, extending near their bottoms, so as to form narrow passages in the bottom of each chamber, and thereby give a downward and upward direction to the wort through said chambers, the latter having communication at opposite sides of their upper ends, with shallow chambers, through which the wort passes to, and from the deep chambers, and the latter forming in connection with an external vessel within which they fit, a series of inclosed chambers, having communication with each other, and through which passes a current of cold water, in direction opposite to that of the wort.

To enable others to make and use my invention I will proceed to describe it.

$a'\ a\ a$ are five (more or less) deep narrow chambers of any convenient length, formed of copper coated with tin, or any other suitable material, arranged parallel to each other, and of equal depth. At the middle of the length of each chamber there is a vertical partition $b$ extending from the top, to near the bottom, for the double purpose of dividing the chamber into two equal sections, and forming a small passage $c$ at the bottom, for imparting to the wort, a direction through said chamber, downward and upward, from one section into the other, and thereby cause the wort to descend to the coldest part of each divided chamber in its passage from one chamber to another. Each of these divided chambers communicate through openings $d$ at their upper ends, and from opposite sides, with horizontal shallow chambers $e'\ e\ e$ made of a width greater than the chambers $a'\ a$, and through which the wort passes into, and from the said deep chambers as indicated by the arrows $f, f,$ in Fig. 1.

$g$, represents an external case or vessel, made of wood or other suitable material, within which the deep narrow chambers are fitted in such a manner as to form inclosed chambers $h\ h$ the tops whereof being formed by the bottoms of the flat or shallow chambers $e$ as shown in Fig. 3. These inclosed chambers $h, h,$ communicate with each other at their ends, through openings $i\ i$ over which are fitted caps $j\ j$ outside of the vessel $g$—as shown in Fig. 2. From the side of each outer deep chamber extends a ledge or plate $k, l,$ equal in width to the chambers of the vessel $g$, but not of an equal length:—the ledge $k$ serves to receive the water from the induction tube $m$, and being inclined from said tube, delivers the water in the chamber, and the ledge $l$ serves to discharge the water after it has passed through the series of chambers $h$, and for that purpose inclines toward the eduction spout $n$ projecting from the opposite side of the vessel $g$. Now it will be seen that the wort being admitted into the shallow chamber $e'$ passes at the end thereof, into one section of the deep chamber $a'$ through the passage $c$ of the partition and rises in the opposite section of the same chamber as shown in Fig. 4 and passes thence through the end opening $d$ into the shallow chamber $e$ and so, in the direction of the arrows $f\ f$ of Fig. 1 until it arrives at the discharge spout $q$. The introduction of a current of cold water into the tube $m$ passes over the end of the ledge $k$, through the inclosed chamber $h^1$, cap $j^1$, and into the adjoining chamber $h$ wherein it rises, and passes through the cap $j$, into the next chamber, and so on in the direction of the arrows $s\ s$ until it arrives at the eduction pipe $n$. Each deep narrow chamber is provided with a hole in its bottom, through which the wort remaining therein below the level of the eduction tube, is drawn off, by withdrawing the plug $r$ or by which the chambers are cleaned when required. The lower caps *j* of the inclosed chambers *h* are also furnished with plugs *u* which when withdrawn, allows the water remaining in the chambers *h* below the level of the eduction spout *n* to be drawn off. This is only required when the apparatus is not in use. The object in forming the communication of the inclosed chambers *h* by the caps *j* near the top of the vessel *g* is to cause the water to rise in contact with the bottoms of the shallow chambers *e*.

Having described my improved apparatus for cooling beer and other fermentative liquors, what I claim as new and desire to secure by Letters Patent, is—

The series of deep narrow open chambers *a' a* when made with vertical partitions *b b* so as to form passages *c* at the bottoms thereof, for imparting to the wort, a direction, downward and upward, through the said chambers, in combination with shallow chambers *e* with which the aforesaid chambers successively communicate, and the inclosed chambers *h* through which flows, in direction opposite to that, of the wort, a current of cold water, in the manner and for the purpose herein set forth and shown in the drawing.

In testimony whereof I have hereunto signed my name before two subscribing witnesses.

ADOLPH HAMMER.

Witnesses:
J. J. SCHNEIDER,
L. J. DAVINSON.